June 14, 1949.                L. FERSING                2,473,367
                           MULTIPLE TURNING HEAD
Filed Nov. 15, 1944                                    2 Sheets-Sheet 1
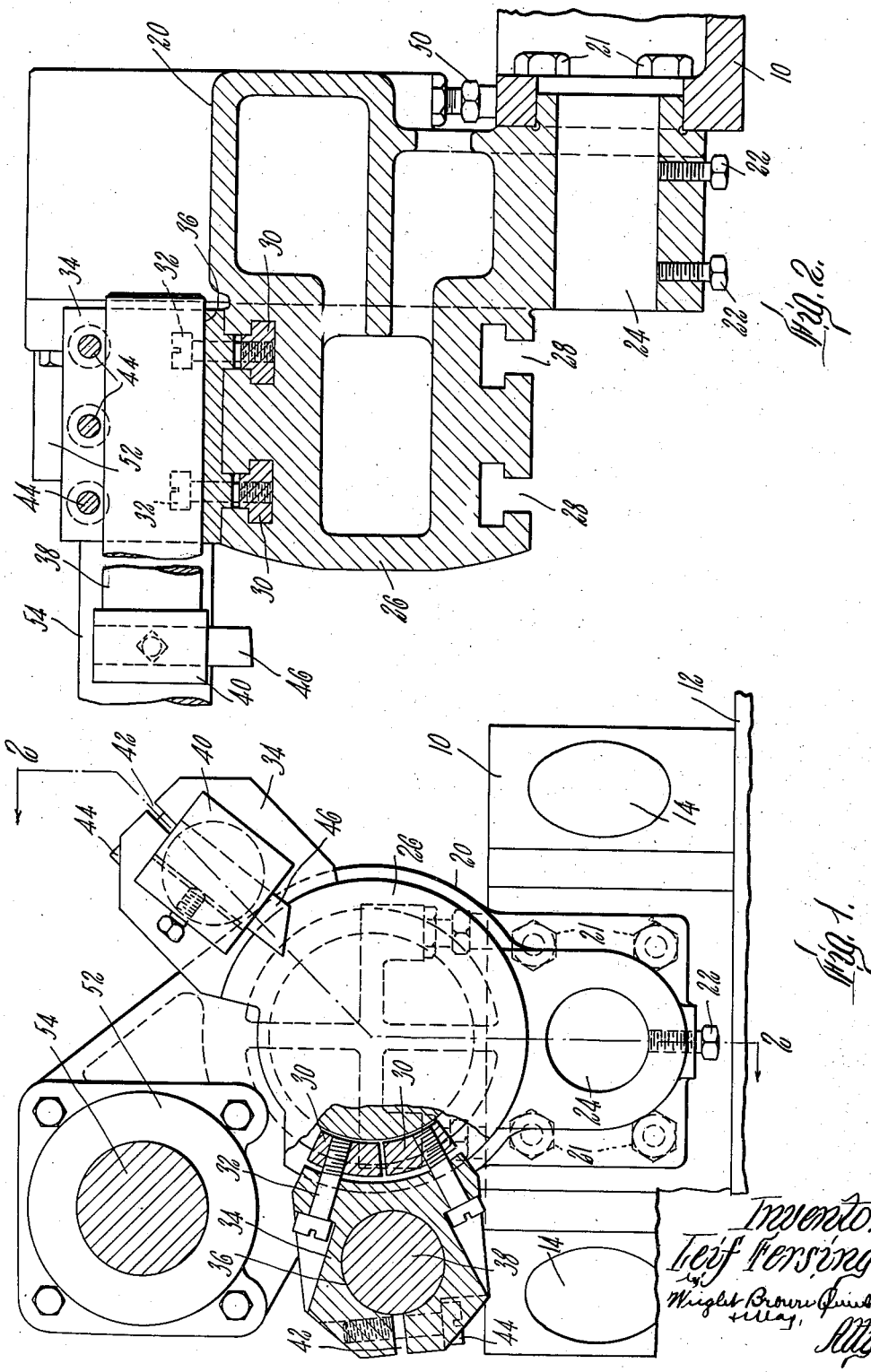

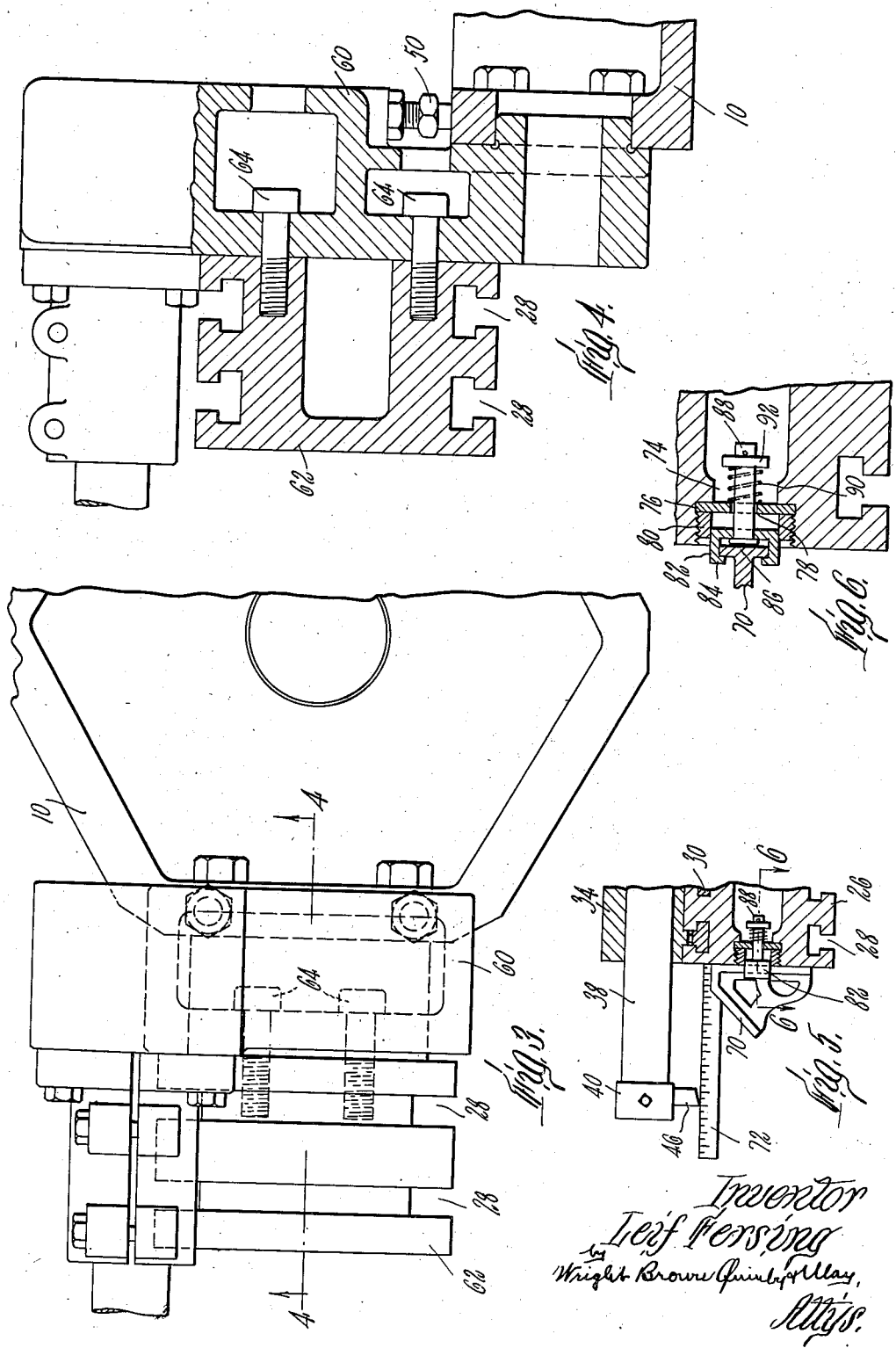

Patented June 14, 1949

2,473,367

UNITED STATES PATENT OFFICE 2,473,367

MULTIPLE TURNING HEAD

Leif Fersing, Springfield, Vt., assignor to Jones & Lamson Machine Company, Springfield, Vt., a corporation of Vermont Application November 15, 1944, Serial No. 563,602

2 Claims. (Cl. 29—57)

This invention relates to improvements in turning heads for supporting lathe tools, and more particularly to turning heads for use on turret lathes.

It is an object of the invention to provide a turning head on which the tool or tools can be freely adjusted as to position so as to be held with maximum rigidity, thus avoiding as far as possible tool vibration during cutting. Moreover, correct adjustment of a tool makes possible the maximum depth of cut. According to the invention, a turning head is provided which affords such a range of tool adjustment thereon that a plurality of tools can be mounted thereon for simultaneous cutting with only such overhang as is necessary for chip clearance. This makes for great rigidity. When using two tools for simultaneous cutting, one may be adjusted to make a relatively heavy cut, the other being adjusted to make a light finishing cut which will leave a smooth surface. Furthermore, the flexibility which characterizes my improved turning head applies equally to tools for internal cutting as well as to those for external cutting.

Another object of the invention as to provide a turning head having a detachable drum to which a plurality of tool blocks can be adjustably secured, the drum being detachable with the tools as a unit without disturbing the adjustment of the individual tools. This feature is of particular value and importance in machining small lots since it makes possible quick interchange of set-ups.

A further object of the invention is to provide a turning head which supports tools in such a way that some of them can be used simultaneously with carriage tools.

The invention also includes a spring loaded clamp to hold a combination square against the face of the turning head so as to facilitate the proper adjustment of the cutter holders. By using such a square in conjunction with a tool-setting gage described and illustrated in my co-pending application Serial No. 563,601, filed November 15, 1944, now Patent No. 2,443,704, granted June 22, 1948, for Tool gage tools can be properly set without the necessity of first making a working sample, thus eliminating a slow and expensive procedure in setting up tools for a job.

Other advantageous features of the invention will be apparent from the following description of certain embodiments thereof and from the drawings, of which, Figure 1 is an elevational view of a lathe turret on which is mounted a turning head embodying the invention, a portion being broken away to show in section.

Figure 2 is a section on the line 2—2 of Figure 1.

Figure 3 is a plan view of a turret with a modified form of turning head mounted thereon.

Figure 4 is a section on the line 4—4 of Figure 3.

Figure 5 is a fragmentary sectional view of a turning head drum having a clamp engaging a combination square.

Figure 6 is a section on the line 6—6 of Figure 5.

While the invention hereinafter described is applicable to lathes in general, it is illustrated in the drawings in connection with an automatic turret lathe. A hexagonal turret 10 is shown in Figure 1, the turret being mounted on a ram 12 and being provided with the usual indexing mechanism (not shown) by which its six side faces are consecutively presented to the work. Each said face has a bore 14 which is coaxial with the spindle axis of the lathe when its face is presented to the work.

The universal turning head shown in Figures 1 and 2 comprises a body member 20 consisting of a casting the lower portion of which is secured by screws 21 to the turret 10. The casting may have a bore 24 concentric with the turret bore 14 to receive a boring tool (not shown) which can be secured by set screws 22. A cylindrical drum 26 projects from the body member 20 with its axis above and parallel with the spindle axis of the lathe. The drum 26 has two T-slots 28 extending circumferentially around its entire periphery. Within the T-slots are fitted T-nuts 30 having tapped holes which are radial with respect to the drum 26. The nuts 30 receive bolts 32 by which one or more clamp brackets 34 are adjustably secured against the periphery of the drum 26. Each bracket 34 has a bore 36 to receive a shank 38 of a tool holder 40. The bracket is split at 42, the split being bridged by draw bolts 44 which are set up to grip the shank 38 in the bore 36.

Each tool holder 40 carries a tool 46 which extends transversely to the axis of the shank 38 and is longitudinally adjustable in the holder. Since the entire drum 26 is offset from the spindle axis as represented in Figure 1 by the bore 24, it is evident that by securing the clamp brackets 34 in selected positions on the circumference of the drum, the tool can be readily located to cut at any desired radius from the spindle axis within the maximum permitted by the turning head. Cuts on large diameters are made by securing the clamp bracket near the top of the drum. Cuts of small diameters are made by securing the clamp bracket near the bottom of the drum. Cuts of diameters of any intermediate sizes can be made by appropriate location of the clamp bracket on the periphery of the drum. This flexibility of adjustment, moreover, makes it possible to locate the clamp bracket 34 for any particular cut in such a manner that the tool 46 need have an overhang only large enough for chip clearance. This makes for rigidity in tool support, which is highly desirable.

The turning head can be used to support a plurality of tools for simultaneous cutting. For example, one tool may make a relatively heavy cut, a second tool being adjusted to follow with a light finishing cut. Clamp brackets for two tools are shown in Figure 1, but more may be mounted on the drum up to the limit of its capacity. By suitable adjustments also, interior and exterior cuts can be made. Moreover, when mounted to the rear of the spindle axis, such tools can cut simultaneously with carriage tools (not shown) and thus speed up production.

The turning head is provided with reaction studs 50 which bear against the top of the turret and are set up tightly to eliminate all possible looseness between the head and the turret. If desired, the turning head may have a bracket 52 bolted to the upper part thereof with a horizontal bore for a pilot bar 54 which may be secured in the bracket 52 or the headstock of the lathe as preferred.

Figures 3 and 4 show another turning head which is in many respects similar to that shown in Figures 1 and 2. A body member 60 is secured to the turret 10 and is provided with a drum 62 which is removably secured thereto as by bolts 64. The drum 62 has two T-slots 28 in its periphery for the selective location of one or more tool holder clamp brackets in the manner hereinbefore described. Thus a drum 62 with tools set thereon can be removed together with the tools and laid aside for future use, another drum being then mounted on the body member 60. This is particularly advantageous where small lots are to be machined and repeat orders are expected.

As indicated in Figure 5, when a clamp bracket 34 has been mounted on the periphery of the drum 26 or 62, the shank of the tool holder extends parallel to the drum axis. For any given job, the tip of the tool 46 must be located at a certain distance from the end of the drum 26. To facilitate adjustment of the shank 38 when such distance is known, a square 70 may be held against the end face of the drum so that a graduated arm 72 thereof will project parallel with the axis of the drum. Figures 5 and 6 show convenient holding means for the square. As shown, a central bore 74 is provided in the drum. Part of the bore is enlarged and tapped to receive a plate 76 with a central perforation 78 and a threaded ring 80. Slidably fitted in the ring 80 is an element 82 having inturned flanges 84 to engage the upright edge portion 86 of the square 70. The element 82 is drawn inward by a rod 88 which is attached thereto and which extends through the aperture 78 in the plate 76. A compression spring 90 presses on a washer 92 near the inner end of the rod 88. This holds the square 70 firmly against the end face of the drum.

I claim:

1. A turning head adapted to be mounted on a lathe, said head having a non-rotatable drum, means for securing said head to a lathe with the axis of said drum parallel to the spindle axis of the lathe, said drum having circumferential slots in its periphery to receive tool holder clamps.

2. A turning head adapted to be mounted on a turret lathe, said head having a non-rotatable drum, means for securing said head to the turret of said lathe with the axis of said drum parallel to the spindle axis of the lathe, said drum having circumferential slots in its periphery to receive tool holder clamps.

LEIF FERSING.

REFERENCES CITED

The following references are of record in the file of this patent:

UNITED STATES PATENTS

| Number | Name | Date |
| --- | --- | --- |
| 332,806 | Kelly | Dec. 22, 1885 |
| 452,524 | Jennings | May 19, 1891 |
| 497,769 | Conradson | May 23, 1893 |
| 510,020 | Hartness | Dec. 5, 1893 |
| 740,107 | Dworzek | Sept. 29, 1903 |
| 1,513,883 | Bausch | Nov. 4, 1924 |
| 2,154,496 | Darash | Apr. 18, 1939 |

FOREIGN PATENTS

| Number | Country | Date |
| --- | --- | --- |
| 153,135 | Great Britain | Nov. 4, 1920 |
| 394,575 | Great Britain | June 29, 1933 |